Patented May 11, 1948

2,441,516

UNITED STATES PATENT OFFICE 2,441,516

INTERPOLYMERS OF ALLYLIC ALCOHOL AND ALLYLIC ACRYLATES

Robert H. Snyder, Newark, N. J., assignor to United States Rubber Company, New York, N. Y., a corporation of New Jersey No Drawing. Application July 12, 1944, Serial No. 544,627

5 Claims. (Cl. 260—84)

This invention relates to new compositions of matter which are denoted interpolymers of a monomeric allylic acrylate and an allylic alcohol.

According to my invention, a method is provided for preparing a new class of unsaturated polymeric materials which are soluble in a variety of organic solvents and which can be converted to insoluble, infusible products by heat and/or catalysts, or by interpolymerizing them with other unsaturated organic materials capable of addition polymerization.

It is known to polymerize allylic acrylates. At temperatures below 100° C., insoluble, infusible products are formed in low conversions, unless the concentration of monomer is kept below 40% by weight of the reaction mixture. Increased yields of soluble products can be obtained at temperatures above 100° C., but some insoluble polymer is often formed during the time required to bring the reaction mixture temperature to 100° C., and the amount of the insoluble polymer formed tends to increase with an increase in the time required to attain reaction temperature, hence the difficulties in securing a reproducibly uniform product are materially enlarged. It is also known that soluble, fusible resins can be prepared from allylic acrylate by halting the polymerization before gelation occurs, but the low and inefficient conversion of monomer to polymer renders the large-scale preparation of the products by this method uneconomical.

I have found that by polymerizing an allylic acrylate in the presence of at least 100% by weight (based on the acrylate) of an allylic alcohol certain desirable and unexpected results are obtained, viz:

(1) The polymerization can be carried out by the use of conventional peroxide catalysts at temperatures below 100° C. to give high yields of soluble, fusible products. The concentration of monomer in the reaction mixture does not have to be kept below 40%; in fact the preparation of my new interpolymers can be carried out in the absence of any solvent other than the polymerizable monomers themselves.

(2) The products formed are of lower molecular weight than those obtained by carrying out the polymerization in the absence of allylic alcohol; as a result, solutions of my products in organic solvents have low viscosities.

(3) My new polymers are true interpolymers of an allylic acrylate and an allylic alcohol. They contain, attached to the polymer chain, hydroxymethyl groups derived from the allylic alcohol which has interpolymerized with the allylic acrylate. The presence of the hydroxymethyl groups in the polymer renders it capable of being modified by reaction with reagents known to react with primary alcohols, including alkyl halides, allylic halides, acyl halides, organic acids, organic acid anhydrides, and organic isocyanates and isothiocyanates, as well as the corresponding polyfunctional compounds such as the dihalides, diisocyanates, polycarboxylic acids, etc.

In carrying out my invention a mixture of the allylic acrylate and the allylic alcohol is caused to polymerize by heating, preferably in the presence of peroxidic catalysts such as acetyl peroxide, benzoyl peroxide and tertiary-butyl peroxide. The reaction temperatures employed are usually in the range of from about 25° C. to about 120° C. although higher temperatures may be used if desired.

The allylic acrylates which I have found to be operable in my invention are those having the formula

$$CH_2=C(R)-CO-O-CH_2-C(R)=CH_2$$

wherein each R can be hydrogen, or alkyl, e. g., methyl, ethyl, or halogen, e. g., chlorine. Exemplary of such compounds are allyl acrylate, allyl methacrylate, allyl ethylacrylate, methallyl methacrylate, allyl α-chloroacrylate, 2-chloroallyl methacrylate.

The allylic alcohols which can be used in the preparation of my new interpolymers are those which contain the structure

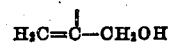

$$H_2C=C-CH_2OH$$

Examples of such alcohols are allyl alcohol, 2-chloroallyl alcohol, 2-methylallyl alcohol (the latter customarily being referred to as methallyl alcohol), and 2-ethylallyl alcohol.

An amount of the allyl alcohol, in excess of 100% by weight based on the weight of the allylic acrylate, substantially inhibits the formation of insoluble, infusible material during the early stages of the polymerization, and insures the production of a soluble, fusible product.

In carrying out the polymerizations the mixture of the allylic alcohol and the allylic acrylate, together with the peroxide catalyst, is heated until the polymerization has proceeded to the desired extent. The extent of polymerization can be determined by measuring the increase in viscosity of the reaction mixture, or by taking out samples from time to time and determining the amount of polymer formed. Incipient gelation, i. e., the formation of insoluble polymer, is marked by a rapid rise in the viscosity. The finished interpolymer may be recovered from the reaction mixture by extracting the unreacted starting materials with a chemical which is a non-solvent for the polymer. Gasoline, carbon tetrachloride or benzene are suitable solvents of this type. The polymer may be purified by dissolving it in a solvent for the polymer, such as acetone, and then adding a non-solvent such as gasoline to precipitate the pure polymer.

The polymer may be dried, and cast or molded in a known manner to form rods, blocks or sheets. It can also be dissolved in an appropriate solvent and employed as a lacquer or impregnating or water-proofing composition.

Application of heat to compositions containing my unsaturated interpolymers, particularly in the presence of catalysts, induces further polymerization, and the resulting cross-linked products are quite indifferent to elevated temperatures and are strongly resistant to attack by solvents. Suitable dyes, pigments, fillers and plasticizers can be conveniently incorporated with my interpolymers at the soluble, fusible stage prior to the final cure.

Because of the fact that my new unsaturated interpolymers are soluble in many organic solvents, and particularly in copolymerizable compounds containing an ethylenic linkage such as methyl acrylate, diallyl fumarate, vinyl acetate, etc., they may be used in a variety of ways. Polymers of my invention may be dissolved in such reactive monomers and the resulting solutions can be polymerized to insoluble, infusible polymers without the necessity of evaporation of a solvent. Solutions containing as much as 40% by weight of the unsaturated interpolymer and 60% of the copolymerizable monomer are still quite fluid and can be applied as coating materials by spraying, brushing, or dipping. Alternatively the solution of the unsaturated interpolymer in a copolymerizable monomer, or mixture of monomers, can be employed in casting, laminating and impregnating operations where articles capable of being preformed and then "set" or cured in the final shape are desired.

The following examples illustrate my invention in more detail; all parts are by weight:

EXAMPLE 1

A mixture of 40 parts of allyl methacrylate and 0.5 part of benzoyl peroxide is dissolved in 160 parts of allyl alcohol and the resulting solution is refluxed for 46 hours. Then the excess allyl alcohol is removed by distillation under diminished pressure, and the polymer is isolated by pouring the viscous residue into gasoline. The crude polymer thus obtained is purified by repeatedly dissolving it in acetone and precipitating it with gasoline. After drying to constant weight in vacuo, 47.3 parts of a solid product are obtained.

*Analysis.*—Found: C, 65.49, 65.51, 65.55%; H, 8.56, 8.34, 8.46%. Iodine number (Wijs) =142.7, 142.7.

The analyses indicate a copolymer containing approximately 24.4% by weight of allyl alcohol units and 75.6% of allyl methacrylate units. On the basis of the yield, this corresponds to a conversion of approximately 82.6% of the monomeric allyl methacrylate to the polymeric form.

I have found that my unsaturated interpolymers undergo a secondary reaction to form an inner ester, or lactone, with the elimination of a molecule of an alcohol. In the case of the interpolymer of Example 1, this reaction is represented thus:

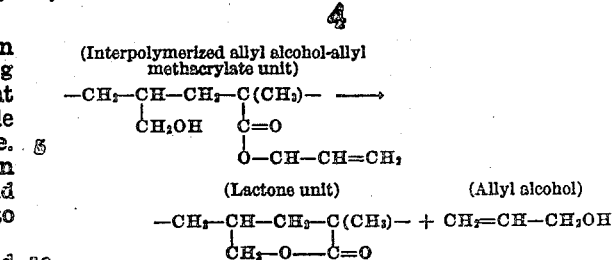

Thus my interpolymer contains a plurality of the following units:

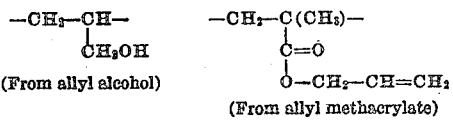

together with minor proportions of the units:

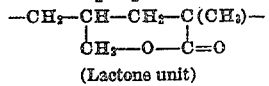

and

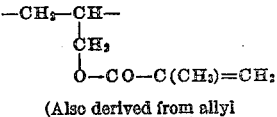

EXAMPLE 2

This demonstrates the presence of free hydroxyl groups in my interpolymer. Three parts of carefully dried polymer prepared as in Example 1 are dissolved in 10 parts of anhydrous pyridine together with 4 parts of phenyl isocyanate and the resulting mixture is heated at 60° C. for 48 hours. The polymer is isolated by pouring the reaction mixture into gasoline and is further purified by repeatedly dissolving it in acetone and precipitating it with ether. The product is dried in vacuo to constant weight and analyzed.

*Analysis.*—Found: N, 2.81, 2.74%.

The presence of nitrogen in the polymer clearly indicates that phenyl isocyanate has reacted with the hydroxyl groups of the allyl alcohol units in the polymer chain to form the corresponding polymeric N-phenyl carbamate.

EXAMPLE 3

(a) A mixture of 56 parts of allyl acrylate and 1.5 parts of benzoyl peroxide is dissolved in 224 parts of methallyl alcohol and the resulting solution is heated at 90° C. for 24 hours. The polymer is isolated and purified as in the previous examples, yielding 69 parts of a solid product.

*Analysis.*—Found: C, 66.27, 66.28%; H, 7.55, 7.80%. Iodine number (Wijs) =111.9, 112.1.

The secondary reaction of lactone formation mentioned in Example 1 above occurs in this case as well.

Moreover, another secondary reaction, namely, an alcohol interchange, between the ester groups of the polymer and the methallyl alcohol in the reaction mixture, occurs to some extent.

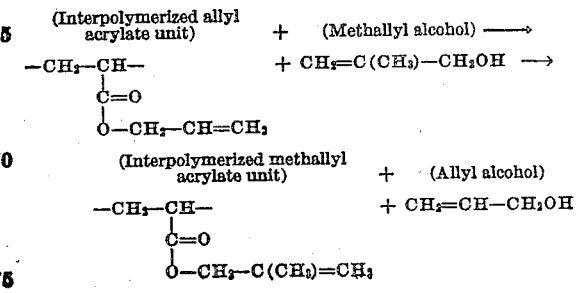

The polymer therefore contains a plurality of each of the following units:

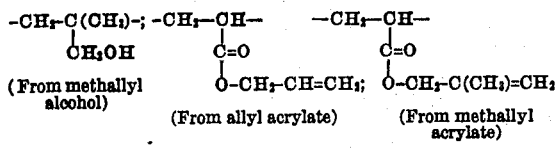
(From methallyl alcohol)   (From allyl acrylate)   (From methallyl acrylate)

together with smaller amounts of the units:

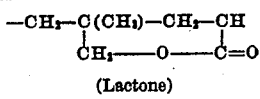
(Lactone)

and

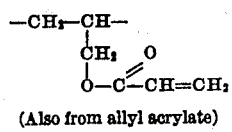
(Also from allyl acrylate)

The analyses indicate an interpolymer containing approximately 7.2% by weight of allyl acrylate units, 23.3% of methallyl alcohol units and 69.5% of methallyl acrylate and/or the isomeric lactone units. From the iodine number the amount of methallyl acrylate units in the polymer is determined to be approximately 47.5% by weight and the amount of lactone units (by difference) is thus 22%.

A solution containing 30 parts of the polymer of Example 3 in 70 parts of acetone has a viscosity of approximately 0.22 poise at 25° C.

The large amount of unsaturation in my interpolymers, indicated by the high iodine number, enables the material to be further polymerized or copolymerized, as illustrated by the following (b, c, d):

(b) Five parts of the polymer are dissolved in 9 parts of acetone and the clear solution is poured in a thin film on a glass plate which is then baked for 20 minutes at 200° C. The resulting film is clear, colorless, tough and completely insoluble in cyclohexanone and acetone.

(c) A mixture of 5 parts of the polymer and 2 parts of diallyl phthalate is dissolved in 9 parts of acetone and poured out in a thin film on a glass plate and baked for 20 minutes at 200° C. to give a hard, clear insoluble film which is non-tacky even at 200° C.

(d) A mixture of 5 parts of the polymer and 2.5 parts of butyl acrylate is dissolved in 9 parts of acetone and baked as in previous cases. The product is a clear, tough, colorless film which is quite flexible and is resistant to attack by organic solvents.

Example 4

This demonstrates the presence of free hydroxyl groups in the copolymer prepared in Example 3. Three parts of the polymer of Example 3 are dissolved in 10 parts of molten chloroacetic anhydride, and the solution is heated at 100° C. for 2 hours. The reaction mixture is then poured into a large excess of cold water, thus precipitating the polymer. Further purification is effected by repeatedly dissolving the polymer in acetone and precipitating it with water. After drying in vacuo a fibrous, solid product is obtained.

*Analysis*—Found: Cl, 5.13, 5.20%.

The presence of chlorine in the polymer clearly indicates the presence of free alcoholic hydroxyl groups in the original interpolymer.

Example 5

To illustrate the effect of an allylic alcohol in increasing the conversion of the monomeric allylic acrylate to the soluble polymeric form, polymerizations are carried out with varying proportions of the allylic alcohol in the reaction mixture, as indicated in Table I below. In each case the allylic alcohol and the allylic acrylate are mixed with catalyst and heated at 60° C. to the point of incipient gelation. At this point the polymerization is halted by cooling the reaction mixture to room temperature. The polymer is isolated from the reaction mixture by the addition of gasoline, and the polymer is purified by repeated solution in acetone and precipitation with gasoline. The yield of polymer is determined by weighing the resulting product after it has been dried in vacuo to constant weight.

For purposes of comparison only, the homopolymerizations of allyl acrylate and of allyl methacrylate are carried out in the absence of an allylic alcohol (I—a, b of Table), but these are not to be construed as coming within the scope of this invention.

Table

| | Allyl Methacrylate, parts | Allyl Acrylate, parts | Allyl Alcohol, Weight Per cent | Methallyl Alcohol, Weight Per cent | Benzoyl Peroxide, parts | Time to Incipient Gelation, hours | Yield Soluble Polymer, parts |
|---|---|---|---|---|---|---|---|
| a | | 100 | | | 0.022 | 2.0 | 7.83 |
| b | 100 | | | | 0.02 | 0.75 | 4.07 |
| c | | 100 | | 128.0 | 1.28 | 2.25 | 45.0 |
| d | | 100 | | 257.0 | 0.535 | 2.5 | 59.3 |
| e | | 100 | | 385.0 | 1.51 | 9.5 | 78.0 |
| f | | 100 | 205.0 | | 0.535 | 2.75 | 67.5 |
| g | | 100 | 310.0 | | 1.5 | 12.5 | 83.5 |
| h | 100 | | | 228.0 | 0.76 | 4.75 | 38.8 |
| i | 100 | | | 343.0 | 1.35 | 5.00 | 54.0 |

Inspection of the table clearly demonstrates that with amounts of the allylic alcohol in excess of 100% based on the weight of the allylic acrylate, high yields of soluble interpolymer are obtained, whereas in the absence of the allylic alcohol, only very small yields of soluble polymer can be obtained.

While I have shown and described various embodiments of the invention, it is to be understood that the invention is susceptible to those modifications which appear within the spirit of the invention and the scope of the appended claims.

Having thus described my invention, what I claim and desire to protect by Letters Patent is:

1. A method which comprises heating monomeric allylic acrylate in the presence of a peroxide catalyst and at least 100% by weight based on the acrylate, of an allylic alcohol, whereby to produce an interpolymer having intact unsaturated allylic radicals conforming to those of the said acrylate and which is characterized as being soluble in acetone, said allylic alcohol having the formula $$CH_2=C-CH_2OH$$
$$\quad\;\; |$$
$$\quad\;\; X$$

where X is a radical selected from the group consisting of hydrogen, methyl, ethyl, and chlorine, and said acrylate having the formula $$CH_2=C(R)-CO-O-CH_2-C(R)=CH_2$$

where R is a radical selected from the group consisting of hydrogen, methyl, ethyl, and chlorine.

2. An acetone-soluble interpolymerizate of an allylic acrylate of the formula $$CH_2=C(R)-CO-O-CH_2-C(R)=CH_2$$

where each R is a radical selected from the class consisting of hydrogen, methyl, ethyl, and chlorine, and at least 100% by weight, based on the acrylate, of an allylic alcohol of the formula $$\qquad\; X$$
$$\qquad\; |$$
$$H_2C=C-CH_2OH$$

where X is a radical selected from the group consisting of hydrogen, methyl, ethyl, and chlorine, the carboxylic groups present in the interpolymerizate being in esterified form, said interpolymerizate having intact unsaturated allylic radicals conforming to those of the said acrylate.

3. An acetone-soluble interpolymerizate of allyl acrylate and at least 100% by weight based on the acrylate of allyl alcohol, the carboxylic groups present in the interpolymerizate being in esterified form, said interpolymerizate having intact unsaturated allyl radicals.

4. An acetone-soluble interpolymerizate of allyl acrylate and at least 100% by weight based on the acrylate of methallyl alcohol, the carboxylic groups present in the interpolymerizate being in esterified form, said interpolymerizate having intact unsaturated allyl radicals.

5. An acetone-soluble interpolymerizate of allyl methacrylate and at least 100% by weight based on the methacrylate, of allyl alcohol, the carboxylic groups present in the interpolymerizate being in esterified form, said interpolymerizate having intact unsaturated allyl radicals.

ROBERT H. SNYDER.

REFERENCES CITED

The following references are of record in the file of this patent:

UNITED STATES PATENTS

| Number | Name | Date |
| --- | --- | --- |
| 2,129,665 | Barrett et al. | Sept. 13, 1938 |
| 2,332,460 | Muskat et al. | Oct. 19, 1943 |
| 2,332,900 | D'Alelio | Oct. 26, 1943 |
| 2,378,195 | D'Alelio | June 12, 1945 |
| 2,401,959 | Pfann et al. | June 11, 1946 |